Dec. 26, 1950 J. H. VOSS 2,535,765

TWO-PARTY METERING AND LINE ADAPTER

Filed July 2, 1947 2 Sheets-Sheet 1

*INVENTOR.*
JOHN H. VOSS

*BY* Chas. W. Canty

ATTORNEY

TWO-PARTY METERING AND LINE ADAPTER

Filed July 2, 1947 2 Sheets-Sheet 2

INVENTOR.
JOHN H. VOSS
BY
Chas. W. Candy
ATTORNEY

Patented Dec. 26, 1950

2,535,765

UNITED STATES PATENT OFFICE 2,535,765

TWO-PARTY METERING AND LINE ADAPTER

John H. Voss, Rochester, N. Y., assignor to Automatic Electric Laboratories, Inc., Chicago, Ill., a corporation of Delaware Application July 2, 1947, Serial No. 758,608

11 Claims. (Cl. 179—8.5)

This invention relates to telephone systems and particularly to systems comprising message rate party line subscribers' stations.

An object of this invention is the provision of simple and efficient circuit arrangements for automatically controlling the selecting and operation of service meters of party line subscribers in an automatic telephone system.

The particular embodiment to be described covers an arrangement for the registration of calls originating on a two-party line in the well known line finder system employing the two hundred line or two hundred point line finder, such as Patent 2,214,908, Serial 269,139, issued to Clarence E. Lomax, September 14, 1940.

According to this invention, means are provided for selectively operating, either one of two message registers of a two party line, on calls originating at party line subscribers' stations when the call is answered by the called party, the selected meter being the one associated with the subscriber who originates the call. This is accomplished by the introduction of a line adapter of this invention, between the subscriber's station equipment and the regular line equipment and the equipment of a well known trunk adapter, between the line finder and the first selector stage. This trunk adapter responds to the reversal of the current from the connector switch, when the called party answers, to place on the "C" lead back to the line adapter of this invention, a momentary "splash" of booster battery to operate the selected meter.

This particular embodiment of this invention employs at one of the telephones on each party line, a calling device similar to the calling device disclosed in U. S. A. Patent No. 1,642,822, granted September 20, 1927, but modified similarly to that disclosed in U. S. A. Patent No. 2,366,647, granted January 2, 1945, to John E. Ostline. The second telephone on each party line can be of the standard two wire type well known to the art, with the ringer wired from ground to one side of the line and the only precaution is that, the ringer of station "B" must be connected to the opposite side of the line from that used for the connection of the ringer in station A.

Figures 1, 3:
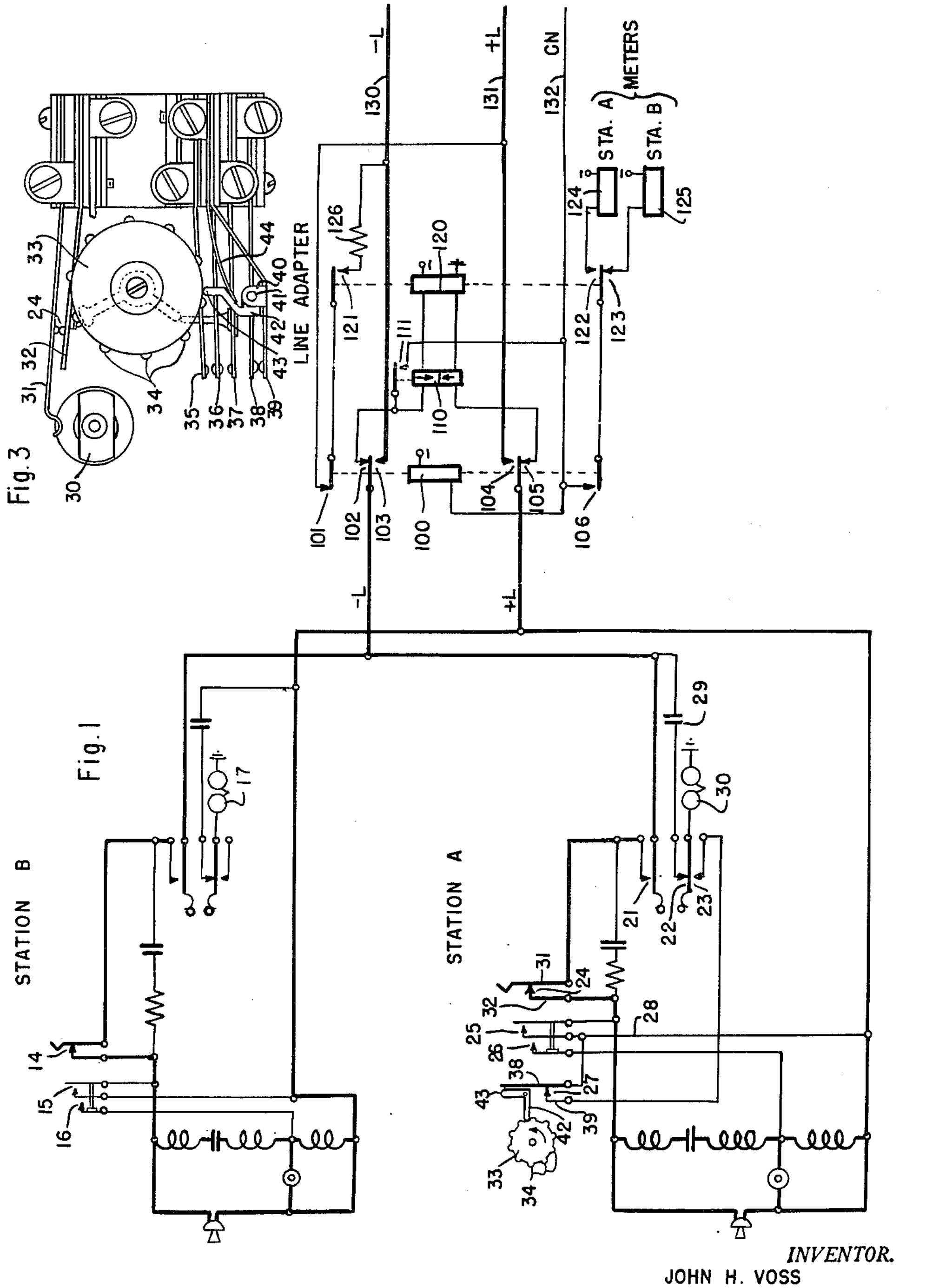

The particular feature of the improved dial used with this invention will be apparent from a perusal of Figure 3. This shows, in addition to the usual impulse springs 31 and 32, and a set of shunt springs 35, 36 and 37, another normally closed set 38 and 39. There is also provided a cam 33 with ten projections, such as 34, which are arranged to operate a pawl 42 on the return movement of the finger wheel (not shown). The spring 39 is equipped with a turned up portion 40 in which a pivot 41 is inserted to pivotally mount the pawl 42 with end 43 in close proximity to the projections 34. This pawl 42 is mounted in such a manner that no movement is communicated to spring 39 when the finger wheel is rotated (clockwise) from its normal resting place. However, when the finger wheel returns to normal, under power of the main spring, from any forward position the projections 34 co-operate with the end 43 of the pawl 42 causing spring 39 to move down (as viewed in Figure 3) to break the contact between springs 38 and 39. This breaking point is synchronized with the break between the impulsing springs 31 and 32, the reason for this will be apparent from a description of the operation of the circuit, which follows.

One telephone on each two party line is equipped with a dial as described above, however, the telephone at the station of the second subscriber may be equipped with a standard dial provided the ringer is wired from one side of the line to ground.

Figure 2:
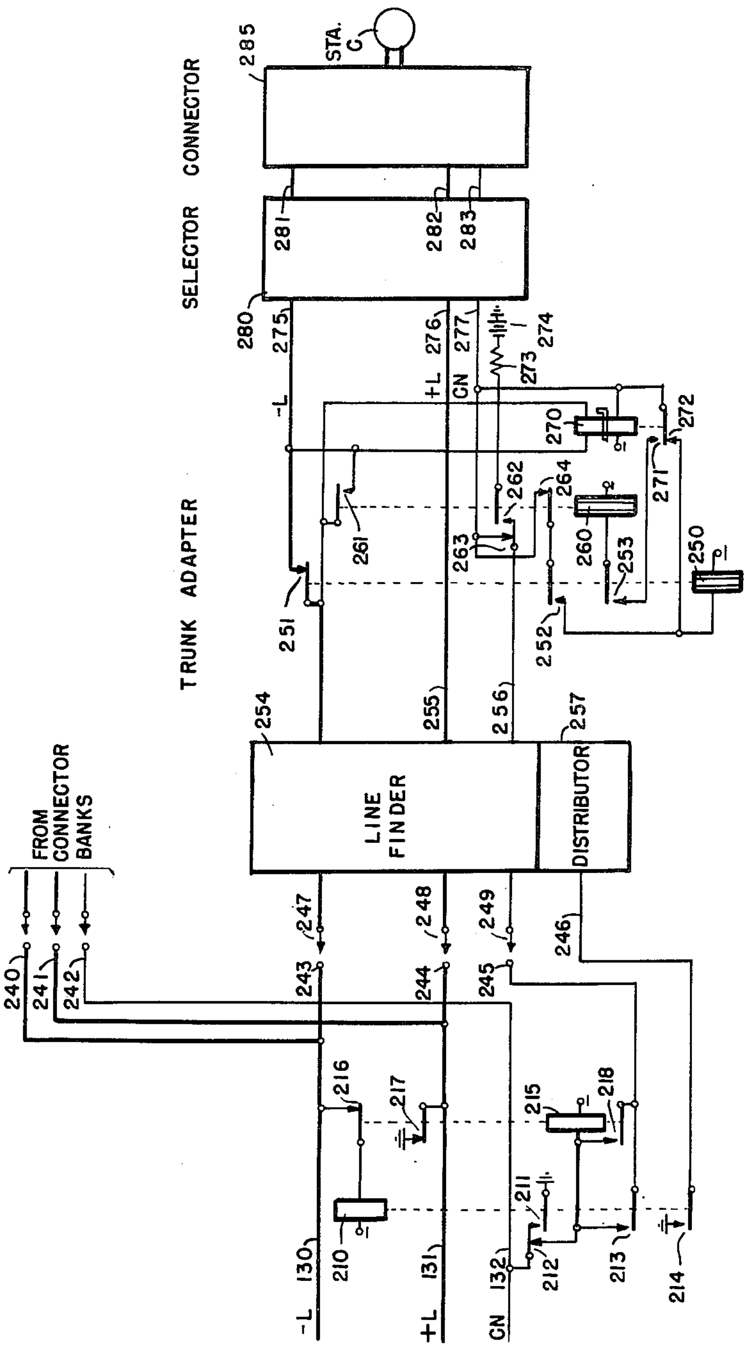

Referring now to Figures 1 and 2, it will be assumed that station A desires to make a call to station C, and the ensuing operations will be described. Station A is one of two stations, the other being station B, on a two-party line having a two conductor circuit, the (+) positive and the (−) negative conductors extending to the automatic exchange. It will be noted that station B is equipped with a so called "standard" dial, well known to the art and the telephone is connected to the telephone line conductors in a well known manner with the ringer arranged to be operated by ringing current over one side of the line to ground.

However, station A is equipped with a dial having one extra set of contact springs which are normally closed. Also, at station A the ringer 30 is connected from ground through its windings, contact 22, condenser 29 and to one line conductor.

As mentioned heretofore, there are two service meters at the exchange which correspond respectively to the two stations. When either station makes a call, a necessary operation to be performed before the call can be completed is the selection of the proper service meter in order to prepare to record the call. The selection is preferably accomplished preliminary to setting up the desired connection and is taken care of automatically through the medium of a line adapter of this invention. When the receiver is removed at station A, or the handset of a monophone type telephone is lifted from its cradle, a circuit is closed at two points 21 and 23, this circuit can be traced as follows; ground, windings of the coils of the ringer 30, contact 23 of the switch-hook spring set, contact 27 of the dial, lead 28, where this circuit divides one branch extending by way of the transmitter, contact 24 of the dial, contact 21 of the hookswitch, the negative (—) line conductor, contact 102 of relay 100, the upper winding of relay 110, the upper winding of relay 120 to battery. The other branch from the grounded ringer extends by way of lead 28, the positive line conductor, contacts 105, and through the lower windings of relays 110 and 120 to ground. Here it should be noted that relay 110 is a differentially connected relay and operates only when current flows through the upper winding alone. The ground to ground connection in the other branch as above described prevents current flow in the lower winding of relay 110. Relay 120 also operates and through its contact 121, resistance 126 is bridged across the conductors 130 and 131 leading to the line equipment, this bridge includes the normally closed contact 101. A circuit can now be traced from ground, contact 217, conductor 131, contacts 101 and 121, resistance 126, conductor 130, contact 216, winding of relay 210 to battery, operating relay 210. Relay 210 at contact 211 connects ground to the CN lead and a circuit is now closed from ground, contact 211, conductor 132, contact 111 (on relay 110 which is now operated) through the upper winding of relay 110, upper winding of relay 120 to battery, locking these two relays in operated position. At the moment relay 210 operated and connected ground through contact 211 to the CN lead to lock relays 110 and 120, this same ground, through the winding of relay 100 to battery, operated relay 100. Relay 100 operates to connect the negative and positive incoming lines, from the calling subscriber's station, through to the line circuit, also closes contact 106 which completes the circuit by which the meter 124 associated with the calling station A is connected to the CN lead, which will, when the called subscriber answers, receive a splash of booster battery to operate this meter, contact 122 of the circuit of meter 124 having been previously closed at the moment relay 120 operated, as described above. Here it should be noted that the adjustment of contact 101 is so arranged that it is the last of the relay 100 contacts to open when relay 100 is operated, therefore, the bridge across the conductors 130 and 131, as mentioned above, is maintained for a sufficient length of time for the contacts 103 and 104 to connect the incoming line circuit to the line circuit as described above, after which the telephone instrument furnishes the means for holding the automatic switches in operated position. Relay 100 at back contacts 102 and 105 opens the original energizing circuit of relays 110 and 120 but these relays are locked over contacts 111 and 211. In the above description it was explained how relay 210 operated and furnished ground through contact 211 back over the CN lead to lock relays 110 and 120.

Two additional circuits were closed by the operation of relay 210, that is, at contacts 213 and 214. Contact 214 connects ground over lead 246 to the distributor 257, of the well known type. The distributor operates to set in motion a line finder 254 to search for the calling line. The line finder 254 performs a vertical movement of its shaft and wipers, followed by a horizontal movement of the wipers and as soon as the wiper 249 of the finder makes contact with the lead 245, the finder stops, relay 215, in the line circuit is operated through this wiper contact, from ground in the finder (not shown) wiper 249, lead 245, contact 213 (of relay 210 which operated previously) winding of relay 215 to battery, operating relay 215. It should be noted that a second circuit to the winding of relay 215 is closed at contact 218 which completes a holding circuit for relay 215 and also this ground from the finder extends through contacts 218 and 212, conductor 132 and contacts 111 for maintaining relays 110 and 120 operated. This is required because the operating circuit of relay 215 will be opened at contact 213 when relay 210 restores, following the operation of relay 215. It should be noted here that, at the moment the wiper 249 stopped on lead 245, as explained above, the wipers 247 and 248 also made contact with the two leads 243 and 244 respectively, thus completing the calling subscriber's line circuit to the first selector, represented by the box 280.

The line finder usually is permanently connected direct to a first selector, but in this invention a slightly different arrangement is provided. A trunk adapter is introduced between the line finder represented by the box 254, and the first selector represented by the box 280. At the moment of seizure of the calling subscriber's line by the line finder and the extension of the subscriber's line circuit to the selector, a well known action takes place, negative line 275 is connected to battery through one winding of a selector line relay (not shown) and the positive line 276 is connected through another winding of the same line relay to ground. The selector line relay operates a second or release relay (not shown) to furnish ground back over the lead 277, which is the CN lead. Ground from the selector 280 over the CN lead 277 through contact 263 and lead 256 constitutes the holding means for all switches in the train up to the selector 280 as well as the ground for maintaining relays 110 and 120 operated. Also this ground in the selector through contact 272 (on relay 270), winding of the slow-to-release relay 250 to battery, operates relay 250. Relay 250 when operated closes contact 252 and 253 and opens contact 251. Contact 252 completes a locking circuit for the winding of relay 250 to ground on the CN lead. Contact 253 prepares a part of the operating circuit to relay 260. Contact 251 opens a series contact in the negative conductor between the line finder and the selector and in this manner removes the short circuit from the upper winding of relay 270 and causes the upper winding of relay 270 to be placed in series in this negative lead. Relay 270 is a well known electropolarized relay and will not operate until after the current is reversed back over the line from the connector 285 which is the well known arrangement and takes place when the called party answers. After relay 270 has operated as described above, then the upper winding may be shunted or remain open, the relay will not again release its armature until the circuit through the lower winding has been opened.

The first digit 2 can now be dialed, the selector 280 (details not shown) will respond and lift its wipers to the second level, automatic rotation will then take place and the wipers will stop on the first idle contact of level two, which will, in this instance, be a set of contacts representing connector 285. The well known action takes place, the line relay of connector 285 (details not shown) is operated, a second or release relay operates to place ground on the CN lead which is the holding ground for the complete train of switches. This ground from the connector 285 over lead 283 through the CN lead in the selector, lead 277, contact 263, lead 256, CN lead through the line finder 254, wiper 249, lead 245, contacts 218, and 212, lead 132, winding of relay 100 to battery completes the holding circuit for the entire switch train and relays 110 and 120. This circuit will be opened momentarily at contact 263, in the trunk adapter, during the short time that the booster battery is applied to the CN lead for the operation of the service meter of the calling line, in this instance meter 124, associated with calling station A.

The connector performs the usual functions of sending ringing current to the called party and ring back tone to the calling party. When the called party answers, the customary reversal of current takes place back over the negative and positive leads of the connection, and in this instance, this reversed flow of current through the upper winding of relay 270 (in the trunk adapter) allows this relay to operate and close contact 271 completing a circuit for the operation of relay 260. This circuit can be traced from ground on the CN lead 277, contacts 271 and 253, winding of relay 260 to battery. Relay 260, at its contact 263 opens the CN lead between the selector and the line finder and at contact 262 booster battery 274 is connected to lead 256 which, previously explained causes the meter 124 to operate and register one call. During the short registration period, a shunt will again be placed across the upper winding of relay 270, at contact 261 of relay 260, however, this short circuit on the upper winding will have no effect on the operation of relay 270 and this relay will remain in operated position for the duration of the call.

Relay 260 at contacts 264 opens the locking circuit of relay 250. Relay 250, however, is a slow to release relay and after an interval restores and opens the circuit of relay 260 at contacts 253. At contacts 251 relay 250 directly connects the negative lead through to the selector independent of the upper winding of relay 270. Relay 260, also being a slow to release relay, restores after an interval to disconnect booster battery 274 from CN lead 256 and to reconnect grounded CN lead 277 to lead 256 at make-before-break contacts 262 and 263. Booster battery 274 is therefore only momentarily connected during the release time of relays 250 and 260 to conductor 256 to operate the calling stations meter. Since relay 270 is maintained operated for the duration of the call relays 250 and 260 are not again operated.

When the calling subscriber at station A replaces his receiver the loop circuit through the telephone will be opened at contact 21, a relay in the connector switch 285 will restore, ground will be removed from the CN lead and all apparatus will return to normal.

It has been explained above how meter 124 has been selected in response to a call originating at station A and further explained how a call has been registered on said meter when the called party answered. A call from station B and the method of selecting and registering a call on meter 125 which is associated with station B will now be explained.

As previously stated, the telephone at station

B can be the same type as at station A or of the standard type, the one shown is of standard type having the winding of its ringer wired to ground from the positive side of the line, which is the oppoiste side from that used for the connecting of the ringer at station A. When the receiver at station B is removed from the switch-hook or the hand-set is lifted from its cradle, one side of the line is not grounded, as in the case of calls originating at station A, therefore, the differentially connected relay 110, in the line adapter circuit does not operate. Relay 120 operates, as previously explained in connection with a call from station A, and remains operated until the call reaches the stage where relay 100 operates to switch the lines through to the line finder, as in the previously described call. When relay 210 operates in response to a call from station B and relay 100 operates to switch the calling line through, relay 120 restores, as the locking circuit for relay 120 has not been closed at contact 111 for the reason that relay 110 does not operate when calls are initiated at station B. When relay 120 restores, meter 125 associated with station B, is connected to the CN lead through contacts 106 and 123. When the call from station B is answered, by the called party, for instance party C, booster battery over the CN lead through contacts 106 and 123, winding of meter 125 to battery, operates meter 125. After the conversation is completed and party B has restored his receiver, all equipment will return to normal position.

What is claimed is:

1. In an automatic system, a party line having two stations, meters at the exchange, one for each station, a meter selecting group comprising three relays, a line relay group including a line relay, the first and second said relays of said meter selecting group operated in response to ground connected on one side of said line in response to one of said stations removing his receiver, means for preventing the said second relay of the said meter relay group from operating in response to the removal of the receiver by said second station, means responsive to the operation of said first relay of said meter selecting group for causing the operation of said line relay in said line relay group, a circuit closed responsive to the operation of said first relay in said line group for operating said third relay of the said meter selecting group, means controlled by the operation of said third relay to extend said calling line to the said line relay group, and said circuit locking the said first and said second relays of the said meter selecting group in case both said first and second relays are operated.

2. In an automatic telephone system, a party line, meters at the exchange, one for each station on the line, automatic switches, means at the exchange responsive to one station initiating a call for giving the said party line access to said automatic switches for completing the required connection, selecting means at the exchange operated responsive to the placing of a ground connection on said line in response to said one station initiating said call for selecting the meter which corresponds to the calling station, a calling device at said one station for transmitting dial impulses for actuating said switches to complete the desired connection, means at one said station operated by said calling device for removing said ground during any series of impulses to prevent interference with the actuation of said automatic switches, a holding circuit for maintaining said selecting means in its selected operated condition independent of the ground connection initially placed on said line and removed by the actuation of said calling device, and means for for completing said hold-circuit to maintain said selection of said meter after initiating said call and during the actuation of said switches in establishing said connection.

3. In an automatic system, automatic switches for completing connections through said system to a called station, a party line having a first calling station and a second calling station, means in said calling stations for transmitting series of impulses over said line to actuate said automatic switches, meters at the exchange, one for each station on said party line, means in said first station for connecting ground to one side of said line when the receiver is removed, meter selecting relays, means in said exchange responsive to said ground for causing the operation of two of said meter selecting relays for selecting the meter which corresponds to said first station, means dependent upon and responsive to the operation of one of said relays for extending said line to said automatic switches, means in said one calling station responsive when any series of impulses is being transmitted for removing said ground and replacing same at the end of each said series.

4. In an automatic telephone system, automatic switches for the completion of connections through said system, a party line having a plurality of stations, service meters at the exchange corresponding to the stations on said line, means at only one of said stations on said line for placing ground on one side of said line in response to the removal of the receiver, selecting relays in said exchange operated responsive to the initial connection of said ground at said one station for selecting the particular meter corresponding to the said one station, a calling device at each station for sending impulses over said line to operate said switches to complete a connection, means in said calling device in said one station for removing the said ground during the impulsing period and for restoring said ground at the end of said impulsing period, a holding circuit for maintaining said selecting relays in their operated condition independent of the ground connection initially placed on said line and removed by the actuation of said calling device, and means for completing said holding circuit to maintain said selection of said meter after initiating said call and during the actuation of said switches in establishing said connection.

5. In an automatic telephone system, a party line, a meter at the exchange for each station on the line, automatic switches at the exchange, calling devices at said stations for controlling said switches, a meter selecting relay, each of said calling devices having a rotatable dial and a normal position therefor, means for connecting ground to one side of said line at the instant a call is initiated from one of said stations for operating said meter selecting relay before said dial is rotated away from its normal position, means in said dial at said one station for removing said ground connection from one side of said line during its return to normal position, means in said dial for controlling said switches over a circuit including two sides of the line in series, a holding circuit for maintaining said meter selecting relay operated independent of the ground connection initially placed on said line and removed by the actuation of said calling device, and means for completing said holding circuit to maintain said selection of said meter after initiating said call and during the actuation of said switches in establishing said connection.

6. In a telephone system, a two station party line, a meter at the exchange for each station on the line, automatic switches at the exchange, means responsive to the initiation of a call from one of said stations for grounding one side of said line, a calling device at each of said stations for controlling said switches over a circuit including two sides of the line in series, means at said one station for removing said ground connection from said line during the operation of said switches to prevent interference therewith, relay mechanism at the exchange operated in accordance with the said initial ground connection or absence of ground connection in response to the initiation of a call on said line for determining which of said meters will be operated to register the call, a holding circuit for maintaining said relay mechanism operated independent of the ground connection initially placed on said line and removed by the actuation of said calling device, and means for completing said holding circuit to maintain said selection of said meter after initiating said call and during the actuation of said switches in establishing said connection.

7. In a telephone system, a party line having a first and a second station thereon, a meter for each station, a first and a second relay individual to said line, a circuit for operating said first relay alone in response to the initiation of a call from the first station on said line and for operating both said first and said second relays in response to the initiation of a call from said second station on said line, a line relay, a circuit completed responsive to the operation of said first relay for operating said line relay, a third relay, a circuit including contacts controlled by said line relay for operating said third relay, contacts controlled by said third relay for extending said line and for opening said circuit to release said first-mentioned first relay, contacts controlled responsive to the release of said first relay for selecting the meter corresponding to said first station in case said first relay alone is operated, a locking circuit, contacts controlled by said second relay for completing said locking circuit in response to the extension of said line in case said call is initiated from said second station for maintaining said first and second relays in operated position, and contacts controlled by said first relay in its operated position for selecting the meter corresponding to said second station.

8. In a telephone system, a party line having a first and a second station thereon, a meter for each station, a first and a second relay individual to said line, a circuit for operating the first of said relays alone in response to the initiation of a call from the first station on said line and for operating both said first and second relays in response to the initiation of a call from said second station on said line, a line relay, a circuit completed responsive to the operation of said first relay for operating said line relay, a third relay, a circuit including contacts controlled by said line relay for operating said third relay, contacts controlled by said third relay for extending said line and for releasing only said first relay, contacts controlled by said first relay to select one of said meters in response to said extension of said line in case said first relay alone is operated, said contacts controlled by said line relay for maintaining both said first and second relays operated, and other contacts controlled by said first relay to select the other of said meters in response to the extension of said line in case both said first and second relays are operated.

9. In a telephone system, a party line having a first and a second station thereon, a meter for each station, a meter selecting relay individual to said line, a circuit for operating said relay in response to the initiation of a call from either station on said line, a line relay, a circuit completed responsive to the operation of said meter selecting relay for operating said line relay, another relay, a circuit including contacts controlled by said line relay for operating said other relay, contacts controlled by said other relay for extending said line and for releasing said meter selecting relay, contacts controlled by the release of said meter selecting relay to select one of said meters in response to said extension of said line in case the call is initiated by the first of said stations, said contacts controlled by said line relay maintaining said meter selecting relay operated in case said call is initiated from said second station, and other contacts controlled by said meter selecting relay to select the other of said meters in response to the extension of said line and in case the call is initiated by the second of said stations.

10. In a telephone system, a party line having a first and a second station thereon, a meter for each station, a line relay individual to said party line normally disconnected from the line conductors of said party line, station identifying means individual to said party line normally connected to the line conductors of said party line for selecting said meters, means for operating said individual station identifying means over said line conductors in response to the removal of a receiver at any one of said stations on the initiation of a call, a circuit completed by the operation of said individual station identifying means for operating said line relay, means responsive to the operation of said line relay for operatively connecting the line conductors of said party line to said line relay and for operatively disconnecting said individual station identifying means from said line conductors of said party line, and a locking circuit closed only in case a particular one of said stations originated the call for maintaining said individual station identifying means in operated position to select the meter corresponding to said one station.

11. In a telephone system, a party line having a plurality of stations thereon, a meter for each station, station identifying means individual to said party line normally connected to the line conductors of said party line for selecting said meters, means for operating said individual station identifying means over said line conductors in response the removal of a receiver at any one of said stations on the initiation of a call, means operated responsive to the operation of said individual station identifying means for disconnecting said identifying means from said line conductors of said line and for further extending said line conductors, and a locking circuit closed dependent upon which one of said stations originated the call for maintaining said individual station identifying means in operated position after said disconnection to select the meter corresponding to said one station.

JOHN H. VOSS.

REFERENCES CITED

The following references are of record in the file of this patent:

UNITED STATES PATENTS

| Number | Name | Date |
|---|---|---|
| 1,720,157 | Voss | July 9, 1929 |
| 1,804,778 | Johnson et al. | May 12, 1931 |
| 1,809,039 | Hovland | June 9, 1931 |
| 2,410,520 | Ostline | Jan. 2, 1945 |
| 2,468,429 | Dehm et al. | Apr. 26, 1949 |